UNITED STATES PATENT OFFICE.

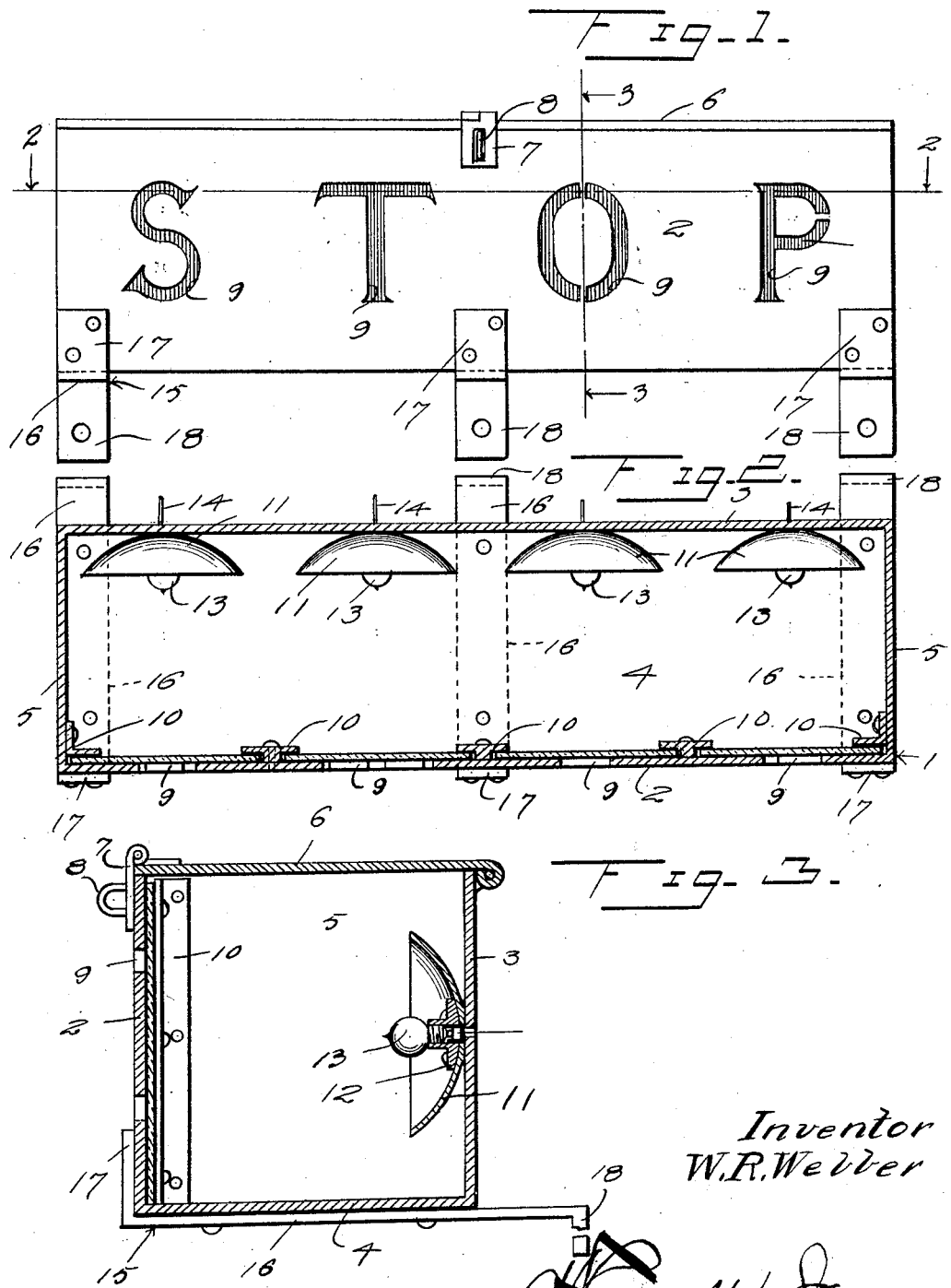

WILLIAM R. WEBBER, OF WILSALL, MONTANA.

AUTOMOBILE SIGNAL.

1,407,826.  Specification of Letters Patent.  Patented Feb. 28, 1922.

Application filed January 16, 1920. Serial No. 351,883.

*To all whom it may concern:*

Be it known that I, WILLIAM R. WEBBER, a citizen of the United States, residing at Wilsall, in the county of Park and State of Montana, have invented certain new and useful Improvements in Automobile Signals; and I do hereby declare the following to be a full, clear, and exact description of the invention, such as will enable others skilled in the art to which it appertains to make and use the same.

This invention relates to new and useful improvements in automobile signals and has for its primary object the provision of a device of this character which will be readily readable by approaching traffic and which can be easily installed on an automobile and which will be simple, durable and efficient in its operation, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a front elevation of an automobile signal constructed in accordance with my invention, Figure 2 is a horizontal sectional view of the same, Figure 3 is a transverse sectional view of the device.

Referring in detail to the drawing, the numeral 1 indicates an elongated casing including front, rear, bottom and end walls 2, 3, and 4, respectively. A cover 6 is hinged to the upper edge of the rear wall 3 and is adapted to rest on the upper edges of the front and side walls 2 and 5 respectively and has secured thereto a hasp 7 to receive a staple 8 carried by the front wall and which hasp may be secured to the staple by a pad-lock or similar locking device.

The front wall 2 has struck out therefrom characters 9 in the form of letters S T O P and a plurality of colored panels are positioned rearwardly of the characters and are preferably colored red. Guide flanges 10 are secured to the front and side walls 2 slidably receive the transparent panels and provides a construction wherein the panels can be removed whenever desired.

Reflectors 11 are secured to the rear wall behind each of the characters 9 and are provided with lamp sockets 12 to receive electric lamps 13 to which are connected wires 14 extending through the rear wall 3 and which are adapted to be connected to an electrical source and to a switch button located in convenient reach of the operator of the automobile, so that in case the operator intends to slow down or make a stop, the switch is closed illuminating the electric lamps which accentuate the characters by the rays of light passing through the colored panels and struck out portions of the front wall.

A plurality of brackets 15 including body portions 16 are secured transversely of the bottom wall 4 and have their forward ends bent at right angles to form flanges 17 that are bolted or otherwise secured to the front wall 2 so as to strengthen and reinforce said wall. The rear ends of the body 15 are bent to form attaching flanges 18 which are adapted to be secured in any desired manner to an automobile and preferably at the rear thereof so that traffic in rear of the respective automobile can readily see or read the signal when illuminated by the operator of the respective automobile.

While I have shown and described the preferred embodiment of my invention it will be understood that minor changes in construction, combination, and arrangement of parts may be made without departing from the spirit and scope of the invention as claimed.

Having thus described my invention, what I claim is:—

A signal box with an upstanding signalling wall, attaching brackets on which the box rests having upstanding lugs secured to the exterior thereof, transparent panels for said wall, retainers for the panels secured to the wall and serving to reinforce it, and a movable cover for the box normally disposed over the panels to retain them in place and locking means for the cover cooperating with the exterior of said wall in line with one of said retainers to brace said wall at the upper portion.

In testimony whereof I affix my signature in presence of two witnesses.

WILLIAM R. WEBBER.

Witnesses:
OSCAR R. CELANDER,
HENRY LEFFINGWELL.